United States Patent
Wang et al.

(10) Patent No.: US 10,939,419 B2
(45) Date of Patent: Mar. 2, 2021

(54) UPLINK CONTROL INFORMATION

(71) Applicant: QUALCOMM Incorporated, San Diego, CA (US)

(72) Inventors: Renqiu Wang, San Diego, CA (US); Hao Xu, San Diego, CA (US); Yi Huang, San Diego, CA (US); Wanshi Chen, San Diego, CA (US); Tingfang Ji, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/619,007

(22) Filed: Jun. 9, 2017

(65) Prior Publication Data

US 2018/0098316 A1 Apr. 5, 2018

Related U.S. Application Data

(60) Provisional application No. 62/402,595, filed on Sep. 30, 2016.

(51) Int. Cl.
| | |
|---|---|
| *H04W 72/04* | (2009.01) |
| *H04L 5/00* | (2006.01) |
| *H04L 1/16* | (2006.01) |
| *H04L 1/00* | (2006.01) |

(52) U.S. Cl.
CPC ......... *H04W 72/0413* (2013.01); *H04L 1/009* (2013.01); *H04L 1/1671* (2013.01); *H04L 5/0046* (2013.01); *H04L 5/0055* (2013.01); *H04L 5/0057* (2013.01); *H04W 72/0446* (2013.01); *H04L 1/1621* (2013.01); *H04L 1/1635* (2013.01); *H04L 1/1664* (2013.01)

(58) Field of Classification Search
None
See application file for complete search history.

(56) References Cited

U.S. PATENT DOCUMENTS

| | | | | |
|---|---|---|---|---|
| 2011/0128917 A1* | 6/2011 | Ko | ........................ | H04B 7/0413 370/328 |
| 2011/0141928 A1* | 6/2011 | Shin | ...................... | H04L 1/0028 370/252 |
| 2011/0274043 A1 | 11/2011 | Nam et al. | | |
| 2012/0243497 A1 | 9/2012 | Chung et al. | | |

(Continued)

FOREIGN PATENT DOCUMENTS

| | | |
|---|---|---|
| EP | 2385736 A1 | 11/2011 |
| WO | 2010148319 A1 | 12/2010 |

OTHER PUBLICATIONS

International Search Report and Written Opinion—PCT/US2017/053239—ISA/EPO—dated Dec. 13, 2017.

(Continued)

*Primary Examiner* — Kevin C. Harper
*Assistant Examiner* — Derrick V Rose
(74) *Attorney, Agent, or Firm* — Patterson + Sheridan, LLP

(57) ABSTRACT

Various additional and alternative aspects are described herein. In some aspects, the present disclosure provides a method for wireless communication. The method includes determining content to include in an uplink control information (UCI) based on a portion of a subframe that includes the UCI. The method further includes transmitting the UCI in the portion of the subframe.

30 Claims, 9 Drawing Sheets

(56) References Cited

U.S. PATENT DOCUMENTS

| | | |
|---|---|---|
| 2013/0279459 A1 | 10/2013 | Lee et al. |
| 2014/0023004 A1 | 1/2014 | Kumar et al. |
| 2016/0338041 A1* | 11/2016 | Li .................... H04L 5/0055 |
| 2017/0013625 A1 | 1/2017 | Damnjanovic et al. |
| 2018/0054280 A1* | 2/2018 | Fu .................... H04B 7/0621 |

OTHER PUBLICATIONS

Qualcomm Incorporated: "Candidate Frame Structures", 3GPP Draft, R1-162207, Frame Structure Candidates, 3rd Generation Partnership Project (3gpp), Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016 (Apr. 2, 2016), XP051080035, Retrieved from the Internet: URL: http://www.3gpp.org/ftp/tsg_ran/WG1_RL1/TSGR1_84b/Docs/.

Qualcomm Incorporated: "Candidate Frame Structures", 3GPP Draft; R1-164695, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, XP051089940, Retrieved from the Internet: URL:http://www.3gpp.org/ftp/tsg_ran/WG1_RL1/TSGR1_85/Docs/ [retrieved on May 14, 2016], 8 pages.

\* cited by examiner

UPLINK CONTROL INFORMATION

CROSS-REFERENCE TO RELATED APPLICATIONS

This application claims the benefit of U.S. Provisional Patent No. 62/402,595, filed Sep. 30, 2016. The content of the provisional application is hereby incorporated by reference in their entirety.

TECHNICAL FIELD

Certain aspects of the present disclosure generally relate to wireless communications and, more particularly, to techniques for communicating uplink control information (UCI) in wireless communication systems.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method for wireless communication. The method includes determining content to include in an uplink control information (UCI) based on a portion of a subframe that includes the UCI. The method further includes transmitting the UCI in the portion of the subframe.

In some aspects, the present disclosure provides a method for wireless communication. The method includes determining content to include in an uplink control information (UCI) based on a portion of a subframe that includes the UCI; and transmitting the UCI in the portion of the subframe.

In some aspects, the present disclosure provides a method for wireless communication. The method includes generating uplink control information (UCI), the UCI including a channel quality indicator (CQI), the CQI comprising at least a portion of a correlation matrix or a whitening matrix; and transmitting the UCI in a subframe.

In some aspects, the present disclosure provides an apparatus for wireless communication comprising a memory and a processor. The processor is configured to: determine content to include in an uplink control information (UCI) based on a portion of a subframe that includes the UCI; and transmit the UCI in the portion of the subframe.

In some aspects, the present disclosure provides an apparatus for wireless communication comprising a memory and a processor. The processor is configured to: generate uplink control information (UCI), the UCI including an acknowledgement (ACK), the ACK comprising a plurality of bits, wherein each bit corresponds to a different code block; and transmit the UCI in a subframe.

In some aspects, the present disclosure provides an apparatus for wireless communication comprising a memory and a processor. The processor is configured to: generate uplink control information (UCI), the UCI including a channel quality indicator (CQI), the CQI comprising at least a portion of a correlation matrix or a whitening matrix; and transmit the UCI in a subframe.

In some aspects, the present disclosure provides an apparatus for wireless communication. The apparatus includes: means for determining content to include in an uplink control information (UCI) based on a portion of a subframe that includes the UCI; and means for transmitting the UCI in the portion of the subframe.

In some aspects, the present disclosure provides an apparatus for wireless communication. The apparatus includes: means for generating uplink control information (UCI), the UCI including an acknowledgement (ACK), the ACK comprising a plurality of bits, wherein each bit corresponds to a different code block; and means for transmitting the UCI in a subframe.

In some aspects, the present disclosure provides an apparatus for wireless communication. The apparatus includes: means for generating uplink control information (UCI), the UCI including a channel quality indicator (CQI), the CQI comprising at least a portion of a correlation matrix or a whitening matrix; and means for transmitting the UCI in a subframe.

In some aspects, the present disclosure provides a computer readable medium having instructions stored thereon for causing at least one processor to perform a method. The method includes determining content to include in an uplink control information (UCI) based on a portion of a subframe that includes the UCI. The method further includes transmitting the UCI in the portion of the subframe.

In some aspects, the present disclosure provides a computer readable medium having instructions stored thereon for causing at least one processor to perform a method. The method includes determining content to include in an uplink control information (UCI) based on a portion of a subframe that includes the UCI; and transmitting the UCI in the portion of the subframe.

In some aspects, the present disclosure provides a computer readable medium having instructions stored thereon for causing at least one processor to perform a method. The method includes generating uplink control information (UCI), the UCI including a channel quality indicator (CQI), the CQI comprising at least a portion of a correlation matrix or a whitening matrix; and transmitting the UCI in a subframe.

In some aspects, the present disclosure provides a method, apparatus, system, computer program product, and processing system as substantially described herein with reference to and as illustrated by the accompanying drawings.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
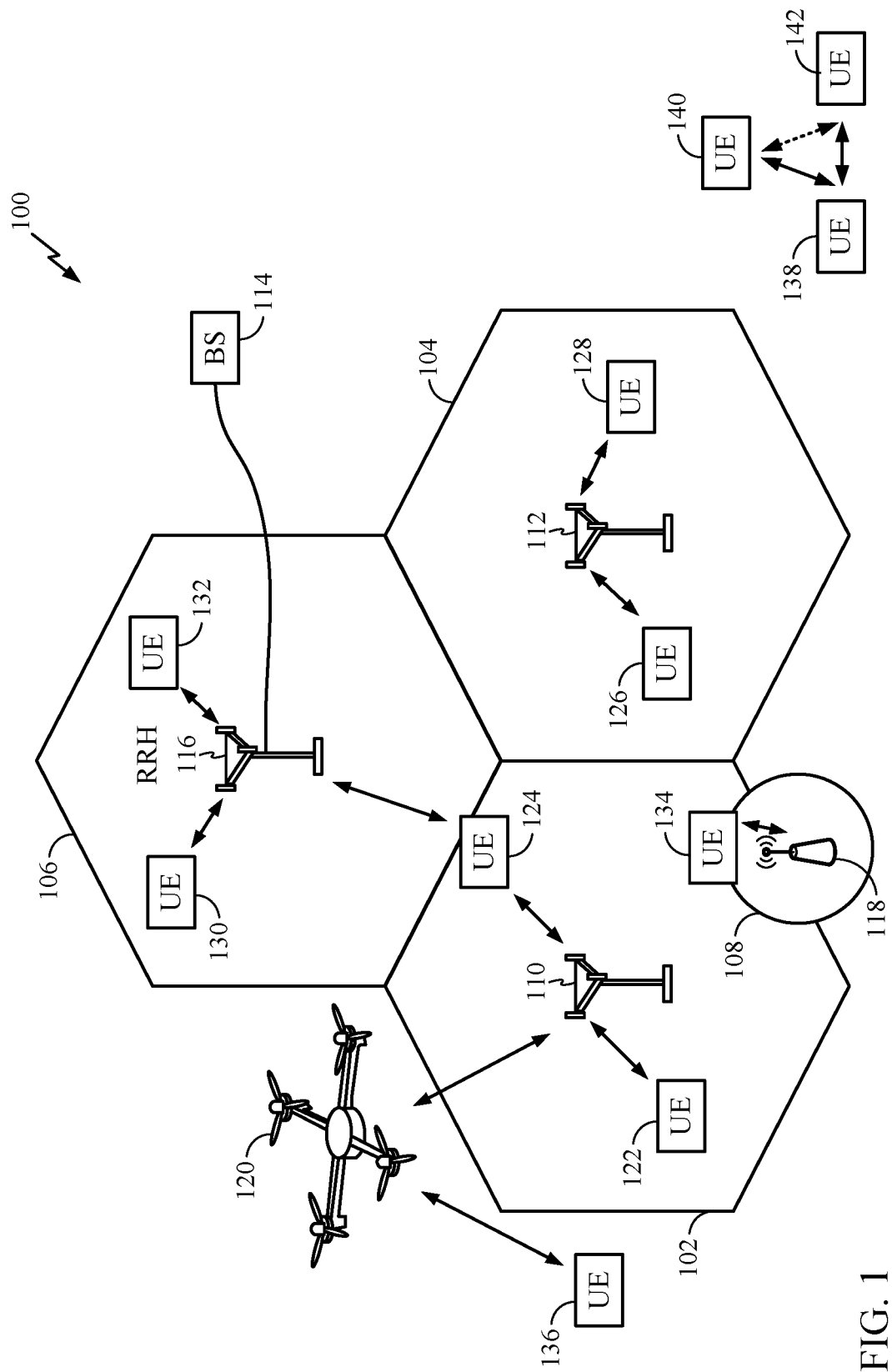
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. In certain aspects, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
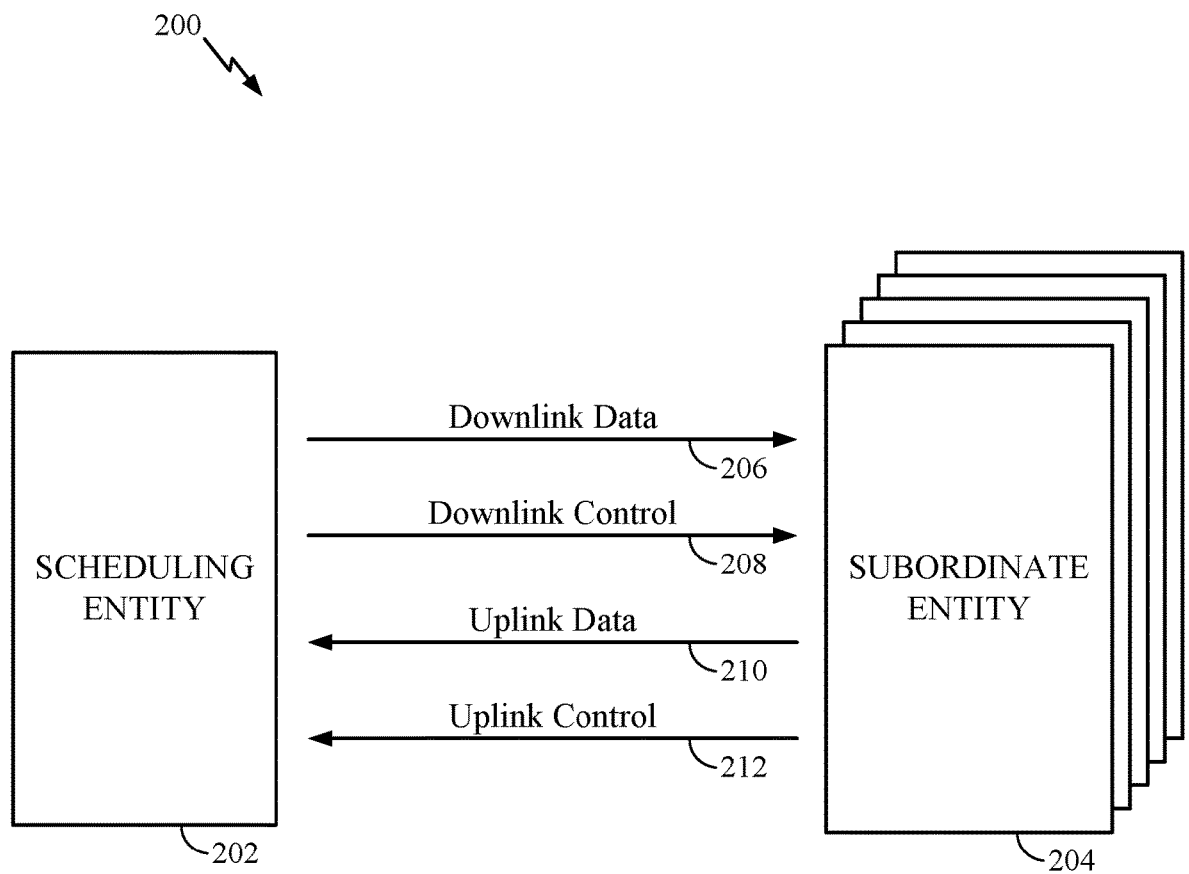
FIG. 2 is a diagram conceptually illustrating an example of a scheduling entity communicating with one or more subordinate entities according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast downlink data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information (UCI) may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
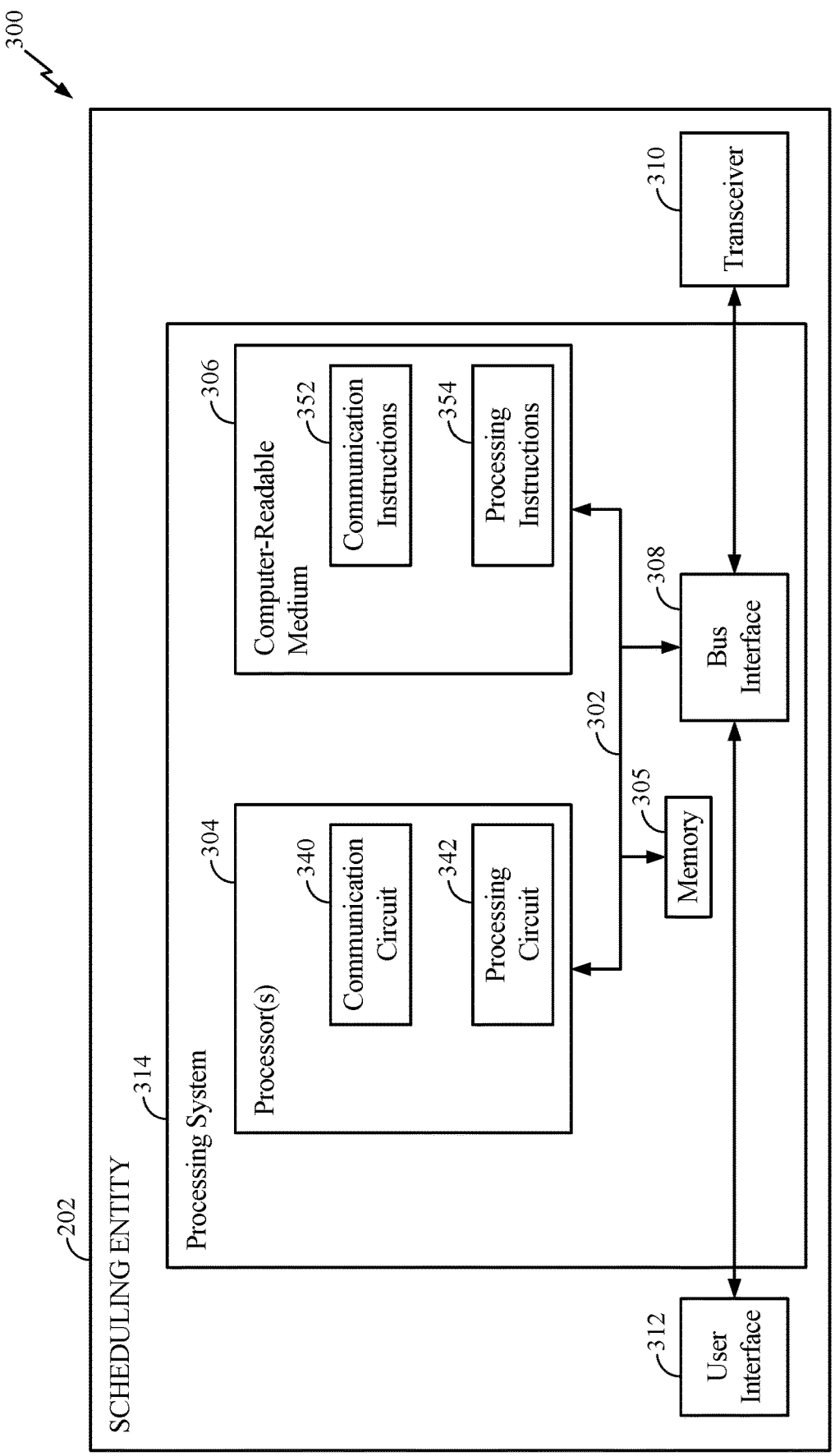
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
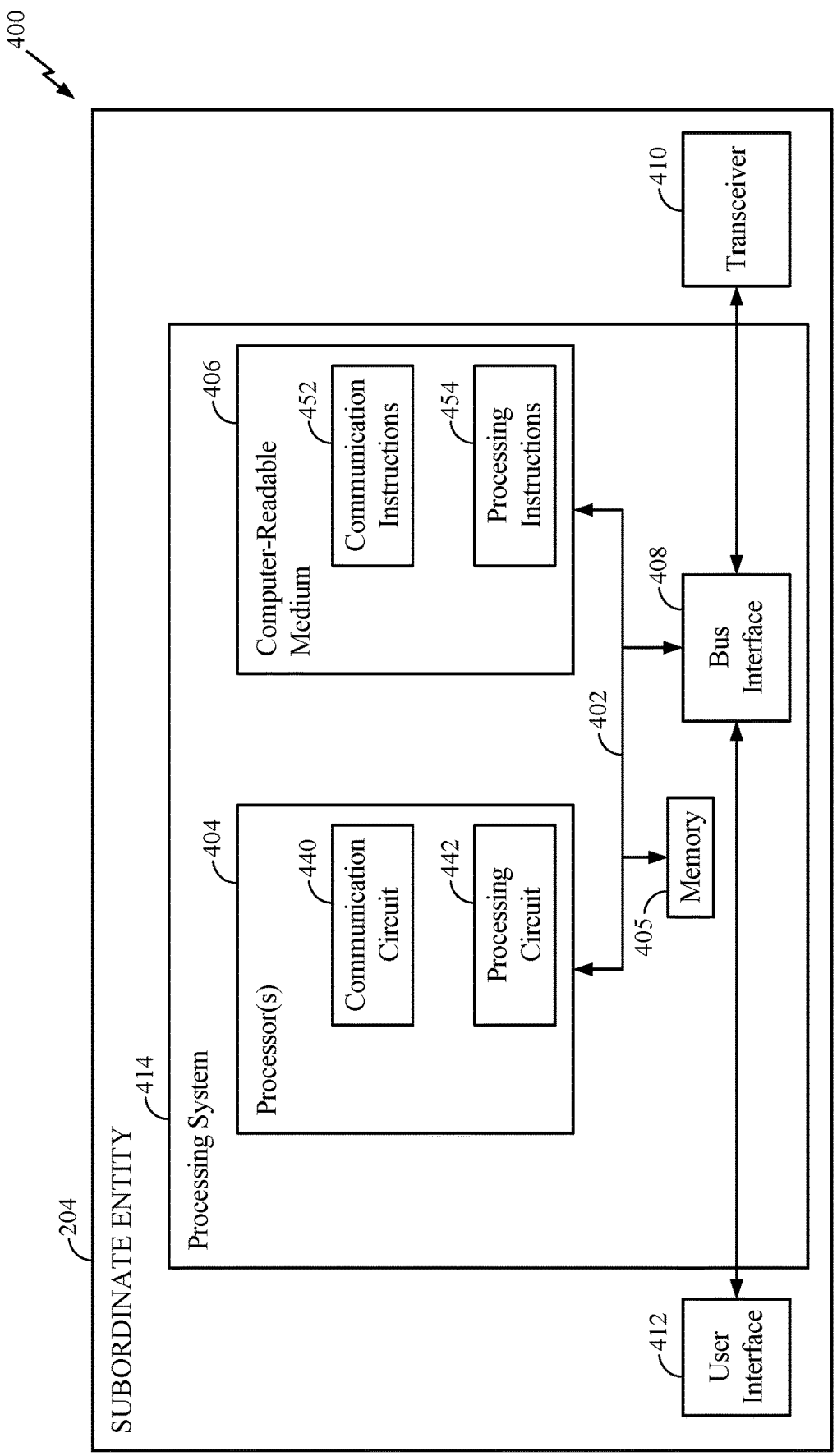
FIG. 4 is a diagram illustrating an example of a hardware implementation for a subordinate entity according to some aspects of the present disclosure.

FIG. 4 is a diagram 400 illustrating an example of a hardware implementation for subordinate entity 204 according to aspects of the present disclosure. Subordinate entity 204 may employ a processing system 414. Subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Figure 5:
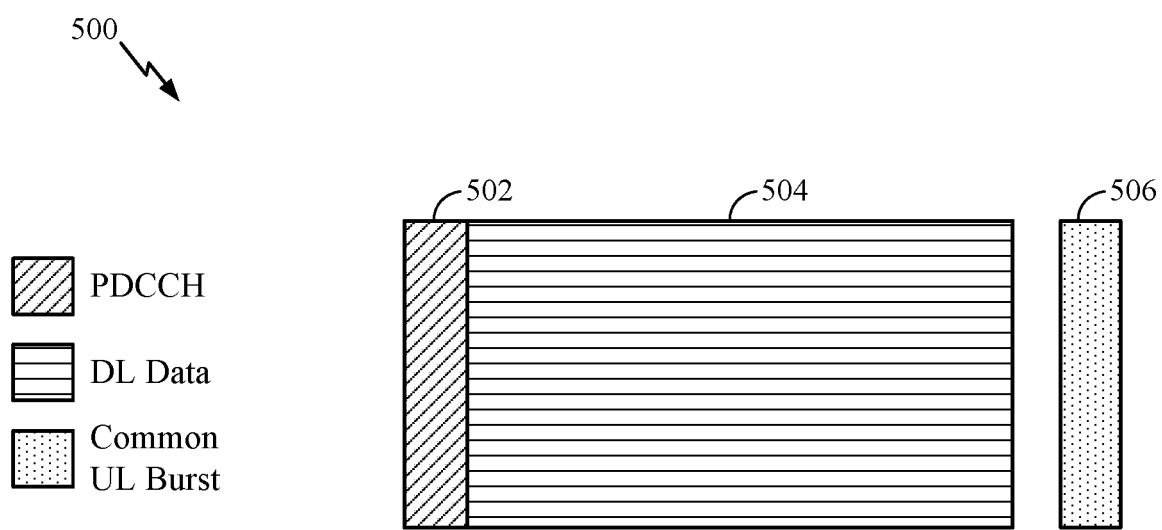
FIG. 5 is a diagram illustrating an example of a downlink (DL)-centric subframe according to some aspects of the present disclosure.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the subordinate entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity 204 (e.g., UE)) to UL communication (e.g., transmission by the subordinate entity 204 (e.g., UE)). One of ordinary skill in the art will understand that the foregoing is merely one example of a DL-centric subframe and alternative structures having similar features may exist without necessarily deviating from the aspects described herein.

Figure 6:
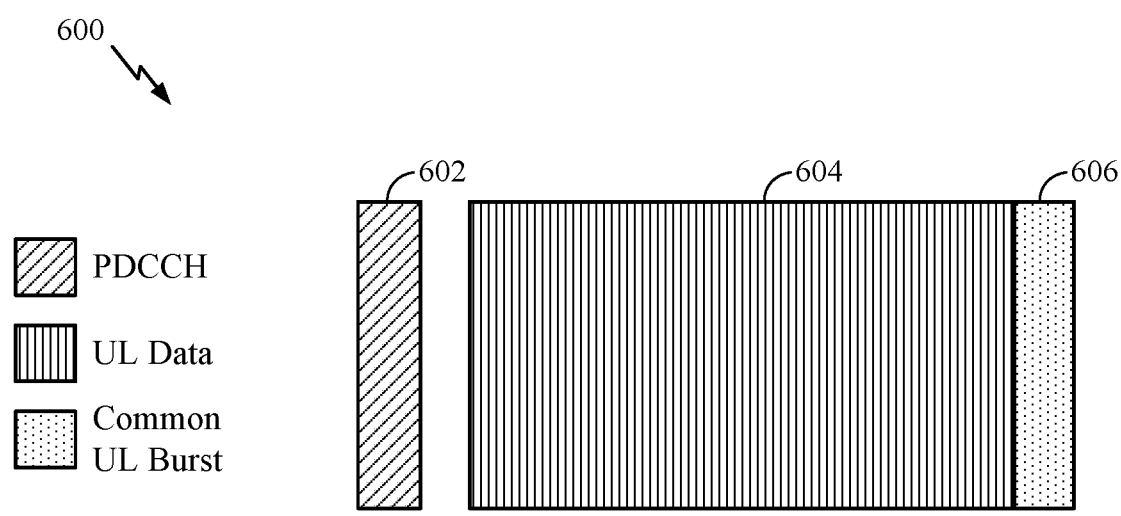
FIG. 6 is a diagram illustrating an example of an uplink (UL)-centric subframe according to some aspects of the present disclosure.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. In some aspects, the UL data portion 604 may also be referred to as a UL regular portion 604. In particular, the UL regular portion 604, in some aspects, may not be limited to including data, and may include other information such as control information, a sounding reference signal (SRS), etc. The UL portion may refer to the communication resources utilized to communicate UL data from the subordinate entity 204 (e.g., UE) to the scheduling entity 202 (e.g., eNB). In some configurations, the control portion 602 may be a physical UL shared channel (PUSCH), physical UL control channel (PUCCH), and/or include a sounding reference signal (SRS). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 506 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

According to aspects of the present disclosure, techniques are provided to include uplink control information in frames and transmit the frames including the uplink control information. For example, a UE may transmit UCI in a TTI (e.g., subframe) to an eNB on a UL channel. In certain aspects, uplink control information (e.g., the payload of UCI) may include one or more of a scheduling request (SR), an acknowledgement message (ACK) (and/or similarly a negative acknowledgement message (NACK)), and a channel quality indicator (CQI). It should be noted that when ACKs are discussed herein, similar techniques may apply to including NACKs in the UCI.

In some aspects, UCI may be sent on the UL in a UL-centric subframe, such as the UL-centric subframe of FIG. 6. For example, the UCI may be sent in an UL regular portion (e.g., UL regular portion 604) and/or a common UL portion (e.g., common UL portion 606) of the UL-centric subframe. Additionally or alternatively, the UCI may be sent on the UL in a common UL portion of a DL-centric subframe (e.g., common UL portion 506). Transmission of data (e.g., the UCI) on the UL regular portion of the UL-centric subframe may be referred to as UL regular burst communication. Transmission of data (e.g., the UCI) on the common UL portion of the UL-centric subframe and/or the DL-centric subframe may be referred to as UL common burst communication.

In some aspects, the payload size of the UCI may be variable. For example, the SR may be 1-bit in size. In another example, SR may be multiple bits. In some example, the ACK and CQI may have variable sizes (e.g., 1-bit to hundreds of bits) as discussed herein. Accordingly, certain aspects herein related to reducing the size of the payload of the UCI to more efficiently transmit the UCI on the UL.

Further, in some aspects, the type of UCI transmitted for UL regular burst communication may be different than the type of UCI transmitted for UL common burst communication. In particular, UL common burst communication may support a smaller payload size (e.g., 1 symbol) as compared to UL regular burst communication. Therefore, in certain aspects, certain information (e.g., CQI) is not included in the UCI transmitted for UL common burst communication, but is included in the UL regular burst communication. In certain aspects a CQI with a first payload size is included in the UCI transmitted for UL common burst communication, and a CQI with a second payload size is included in the UL regular burst communication, wherein the first payload size is smaller than the second payload size.

In certain aspects, the UCI transmitted includes ACK information. In certain aspects, the UCI of a single transmission (e.g., UL common burst communication or UL regular burst communication) includes an ACK corresponding to a single transport block (TB). Such an ACK may be referred to as a TB ACK. In some aspects, a TB may correspond to a unit of transmission per TTI from a device. Accordingly, for each TB, a separate ACK may be sent in a separate frame by the UE to acknowledge receipt of the TB. The ACK may be only 1-bit of information, the value of the bit indicating whether the TB has been received or not.

In some aspects, an ACK may correspond to a plurality of TBs and may be referred to as a bundled TB ACK. In particular, the bundled TB ACK may be 1-bit of information, the value of which indicates whether all of the plurality of TBs have been received or not. If at least one of the plurality of TBs has not been received, the bundled TB ACK indicates the plurality of TBs have not been received. If all the plurality of TBs have been received, the bundled TB ACK indicates the plurality of TBs have been received. A bundled TB ACK may reduce the number of separate ACK transmissions by the UE to acknowledge receipt of multiple TBs, while keeping the payload size of the UCI small (e.g., 1-bit). However, since the bundled TB ACK is for a plurality of TBs, even if one TB is not received, the ACK generally indicates the plurality of TBs are not received so all of the plurality of TBs may be retransmitted.

A transport block may further be segmented into a plurality of code blocks (CBs). In some aspects, an ACK may indicate which CBs (e.g., of one or more TBs) have been received or not. Such an ACK may be referred to as a CB ACK. The CB ACK may include a number of bits corresponding to the number of CBs indicated as received or not, where the value of each bit indicates whether the corresponding CB is received or not. A CB ACK may increase the size of the payload of the UCI to accommodate the additional bits. However, since multiple CBs are acknowledge in a single UCI transmission, the number of ACK transmissions may not be increased. Further, the amount of data (e.g., number of CBs) retransmitted may be reduced as only CBs indicated as not received are retransmitted instead of the entire TB.

In some aspects, in order to reduce the payload size of the UCI as compared to a CB ACK, a bundled CB ACK may be included in the UCI instead. The bundled CB ACK may refer to an ACK where each bit of the ACK corresponds to multiple CBs (e.g., of one or more TBs). For example, CBs may be grouped into bundles of a particular bundle length (e.g., 2, 3, 4, etc. CBs per bundle). The value of each bit in the bundled CB ACK may correspond to whether the CBs of a particular bundle have been received or not. For example, if the CBs are ordered 0 to N−1, and the bundle length is T, the number of bundles B=ceiling(N/T). Accordingly, the number of bits of the bundled CB ACK is B. Each bit in order 0 to B−1 of the bundled CB ACK refers to CBs B*T to ((B+1)*T−1). The last bit of the bundled CB ACK may refer to a fewer number of CBs than the bundle length as the number of CBs may not be an integer multiple of the bundle length. In certain aspects, the bundle lengths of the CB groups may not be the same. For example, one bundle of CBs may have a different bundle length than another bundle of CBs.

In some aspects, an ACK may indicate which TBs of a plurality of TBs have been received or not. Such an ACK may be referred to as a group ACK. The group ACK may include a number of bits corresponding to the number of TBs indicated as received or not, where the value of each bit indicates whether the corresponding TB is received or not. A group ACK may increase the size of the payload of the UCI to accommodate the additional bits. However, since multiple TBs are acknowledged in a single UCI transmission, the number of ACK transmissions may not be increased, and may be decreased as compared to a TB ACK. Further, the amount of data (e.g., number of TBs) retransmitted may be reduced as only TBs indicated as not received are retransmitted instead of multiple TBs as compared to a bundled TB ACK.

In some aspects, in order to reduce the payload size of the UCI as compared to a group ACK, a bundled group ACK may be included in the UCI instead. The bundled group ACK may refer to an ACK where each bit of the ACK corresponds to multiple TBs. For example, TBs may be grouped into bundles of a particular bundle length (e.g., 2, 3, 4, etc. TBs per bundle). The value of each bit in the bundled group ACK may correspond to whether the TBs of a particular bundle have been received or not. For example, if the TBs are ordered 0 to N−1, and the bundle length is T, the number of bundles B=ceiling(N/T). Accordingly, the number of bits of the bundled group ACK is B. Each bit in order 0 to B−1 of the bundled group ACK refers to TBs B*T to ((B+1)*T−1). The last bit of the bundled group ACK may refer to a fewer number of TBs than the bundle length as the number of TBs may not be an integer multiple of the bundle length.

Accordingly, in certain aspects, a particular ACK type (e.g., TB ACK, bundled TB ACK, CB ACK, bundled CB ACK, group ACK, bundled group ACK, or other ACK type) may be used in the payload of a UCI depending on the payload size desired for the UCI, desired number of UCIs to transmit/timing for transmitting the ACKs, and/or desired amount of data retransmissions to avoid. In particular, based on the selected ACK type, the payload size of the UCI can be changed to acknowledge the same number of TBs or CBs.

In certain aspects, the UCI transmitted includes a CQI. In some aspects, a rank indicator (RI) is not included in the CQI. For example, communication devices (e.g., UE, eNB, etc.) may use time division duplexing (TDD) for communicating. Accordingly, uplink and downlink communication may be across the same bandwidth. The eNB may not need RI from the UE, as the eNB can measure the UL channel and use that information for the DL channel information for the UE, instead of the RI.

In some aspects, the CQI includes one or more of channel state information (CSI), a pre-coding matrix indicator (PMI), and a correlation matrix or a whitening matrix. The payload size of a UCI for such a CQI may range from a few bits to a few hundred bits. In some aspects, in order to reduce the payload size of the UCI, the size of the CQI may be reduced.

Figure 7:
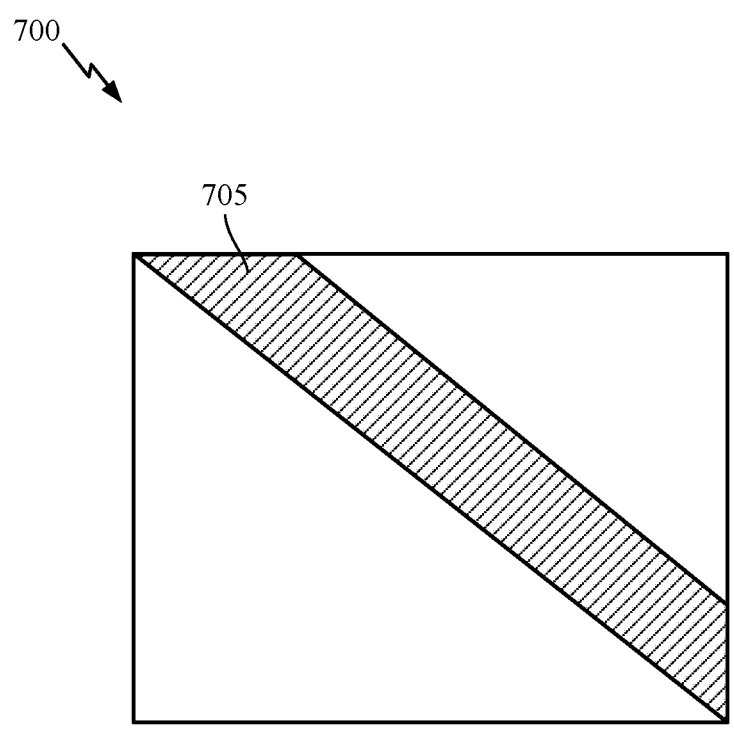
FIG. 7 is an illustration of a correlation whitening matrix according to some aspects of the present disclosure.

In some aspects, an eNB may disable the UEs use of a correlation or whitening matrix, and therefore the correlation matrix or the whitening matrix may not be included in the CQI, further reducing the payload size of the UCI. In some aspects, the dimensionality of the correlation matrix or the whitening matrix may be reduced to reduce the payload size of the UCI (e.g., for high dimensional multiple-input-multiple-output (MIMO) communications). For example, FIG. 7 is an illustration of a correlation or whitening matrix 700 which may include entries across rows and columns of the matrix. In some aspects, only a subset of the entries of the correlation matrix or the whitening matrix 700 (e.g., the entries corresponding to the slice 705 of the matrix 700) may be included in the CQI reducing the payload size of the UCI. In some aspects, the CQI payload size may also be reduced by quantizing each entry of the correlation matrix or whitening matrix with lower precisions.

Figure 7A:
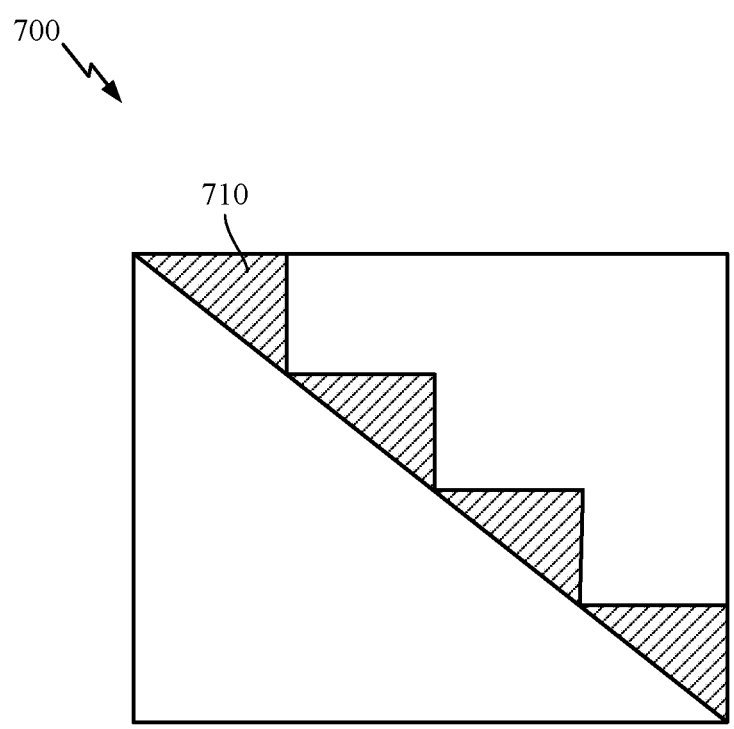
FIG. 7A is another illustration of the correlation whitening matrix of FIG. 7 according to some aspects of the present disclosure.

Further, in some aspects, a correlation or whitening matrix may be symmetric, meaning entries are symmetric across some dimension, e.g., a diagonal of the matrix. Accordingly, only one portion (e.g., upper or lower triangular submatrix) of the correlation or whitening matrix may be included in the CQI thereby reducing the payload size of the UCI, as the other symmetric portion may be derived by that portion by the receiving entity (e.g., eNB). For example, FIG. 7A is another illustration of the correlation matrix or the whitening matrix 700. In some aspects, only a subset of the entries of the correlation or whitening matrix 700 (e.g., the entries corresponding to the slice 710 of the matrix 700) may be included in the CQI reducing the payload size of the UCI. The remaining entries corresponding to the slice 705 may be derived based on the entries in the slice 710 due to the symmetrical nature of the correlation matrix or the whitening matrix 700.

In some aspects, the table for mapping the CSI and/or PMI may be changed which reduces the payload size of the UCI and the meaning of each bit of the CQI.

As discussed, in some aspects, the type of UCI transmitted for UL regular burst communication may be different than the type of UCI transmitted for UL common burst communication. For example, the ACK type of an ACK included in the UCI may be based on whether the UCI is transmitted for UL regular burst communication or UL common burst communication. Further, in some aspects, the UL common burst communication may include only critical UCI content. For example, the UL common burst communication may include a UCI that includes one or more of an SR, a physical layer ACK (e.g., an ACK for physical layer communications) of any of the appropriate ACK types as discussed herein with an appropriate bit size (e.g., 1 to 10 bits), and a transmission control protocol (TCP) ACK (e.g., an ACK for TCP communications) of any of the appropriate ACK types as discussed herein with an appropriate bit size (e.g., 10 bits).

In certain aspects, the UL regular burst communication may include a UCI that includes one or more of an SR, a physical layer ACK (e.g., an ACK for physical layer communications) of any of the appropriate ACK types as discussed herein with an appropriate bit size (e.g., 1 to a few hundred bits), and a CQI of any of the appropriate CQI types as discussed herein with an appropriate bit size (e.g., a few to a few hundred bits).

Figure 8:
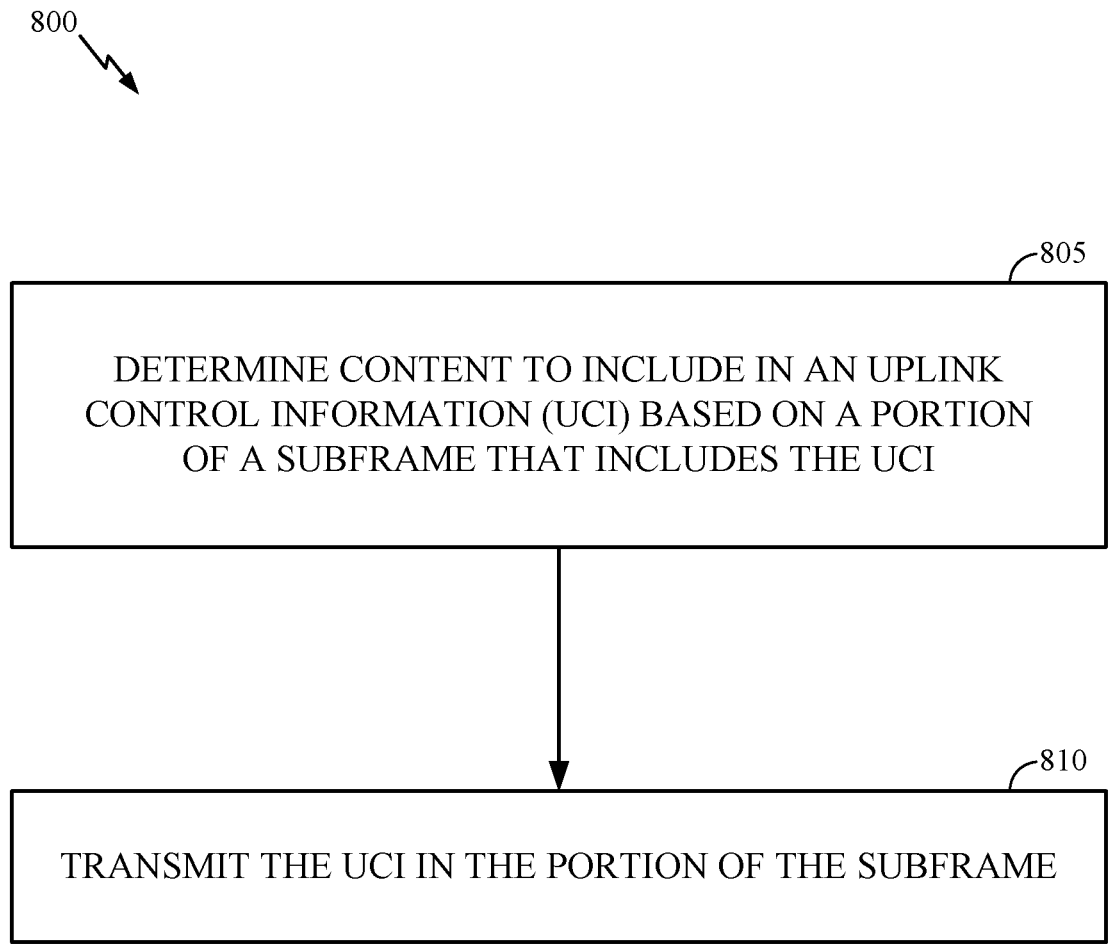
FIG. 8 is a flowchart illustrating example operations for generating uplink control information according to some aspects of the present disclosure.

FIG. 8 is a flowchart illustrating example operations 800 for generating uplink control information according to some aspects of the present disclosure. At 805 content to include in an uplink control information (UCI) is determined based on a portion of a subframe that includes the UCI. At 810 the UCI is transmitted in the portion of the subframe.

In some configurations, such operations, methods, and/or processes may be performed and/or implemented in the subordinate entity 204 or the scheduling entity 202.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication, the method comprising:
   determining content to include in an uplink control information (UCI) based on a portion of a subframe that includes the UCI, comprising:
   determining whether the portion of the subframe comprises a first portion of the subframe or a second portion of the subframe different from the first portion;
   when the portion is the first portion of the subframe, determining the content to be a first content; and
   when the portion is the second portion of the subframe, determining the content to be a second content different from the first content; and
   transmitting the UCI in the portion of the subframe.

2. The method of claim 1, wherein the first portion of the subframe comprises an uplink regular portion and wherein the second portion of the subframe comprises a common uplink portion.

3. The method of claim 2, wherein the determined content comprises a channel quality indicator (CQI) with a first payload size when the portion of the subframe comprises the uplink regular portion, and wherein the determined content either includes a CQI with a second payload size or does not include a CQI when the portion of the subframe comprises the common uplink portion, wherein the second payload size is smaller than the first payload size.

4. The method of claim 3, wherein the determined content further comprises a scheduling request (SR).

5. The method of claim 1, wherein the determined content comprises an acknowledgement (ACK), wherein a type of the ACK is based on the portion of the subframe that includes the UCI.

6. The method of claim 5, wherein the ACK comprises a plurality of bits, and wherein each bit corresponds to a different code block or transport block.

7. The method of claim 6, wherein each bit corresponds to a plurality of code blocks or transport blocks.

8. The method of claim 1, wherein the determined content comprises a channel quality indicator (CQI), the CQI comprising at least a portion of a correlation matrix or a whitening matrix.

9. The method of claim 8, wherein the CQI comprises a reduced dimensionality of the correlation matrix or the whitening matrix.

10. The method of claim 8, wherein the correlation matrix or the whitening matrix is symmetric.

11. The method of claim 8, wherein entries of the correlation matrix or the whitening matrix are quantized.

12. An apparatus for wireless communication comprising:
    a memory; and
    a processor configured to:
    determine content to include in an uplink control information (UCI) based on a portion of a subframe that includes the UCI, wherein to determine the content comprises to:
    determine whether the portion of the subframe comprises a first portion of the subframe or a second portion of the subframe different from the first portion;
    when the portion is the first portion of the subframe, determine the content to be a first content; and
    when the portion is the second portion of the subframe, determine the content to be a second content different from the first content; and
    transmit the UCI in the portion of the subframe.

13. The apparatus of claim 12, wherein the first portion of the subframe comprises an uplink regular portion and wherein the second portion of the subframe comprises a common uplink portion.

14. The apparatus of claim 13, wherein the determined content comprises a channel quality indicator (CQI) with a first payload size when the portion of the subframe comprises the uplink regular portion, and wherein the determined content either includes a CQI with a second payload size or does not include a CQI when the portion of the subframe comprises the common uplink portion, wherein the second payload size is smaller than the first payload size.

15. The apparatus of claim 14, wherein the determined content further comprises a scheduling request (SR).

16. The apparatus of claim 12, wherein the determined content comprises an acknowledgement (ACK), wherein a type of the ACK is based on the portion of the subframe that includes the UCI.

17. The apparatus of claim 16, wherein the ACK comprises a plurality of bits, and wherein each bit corresponds to a different code block or transport block.

18. The apparatus of claim 17, wherein each bit corresponds to a plurality of code blocks or transport blocks.

19. The apparatus of claim 12, wherein the determined content comprises a channel quality indicator (CQI), the CQI comprising at least a portion of a correlation matrix or a whitening matrix.

20. The apparatus of claim 19, wherein the CQI comprises a reduced dimensionality of the correlation matrix or the whitening matrix.

21. The apparatus of claim 19, wherein the correlation matrix or the whitening matrix is symmetric.

22. The apparatus of claim 19, wherein entries of the correlation matrix or the whitening matrix are quantized.

23. An apparatus for wireless communication comprising:
    means for determining content to include in an uplink control information (UCI) based on a portion of a subframe that includes the UCI, wherein the means for determining content is configured to:
    determine whether the portion of the subframe comprises a first portion of the subframe or a second portion of the subframe different from the first portion;
    when the portion is the first portion of the subframe, determine the content to be a first content; and
    when the portion is the second portion of the subframe, determine the content to be a second content different from the first content; and
    means for transmitting the UCI in the portion of the subframe.

24. The apparatus of claim 23, wherein the first portion of the subframe comprises an uplink regular portion and wherein the second portion off the subframe comprises a common uplink portion.

25. The apparatus of claim 24, wherein the determined content comprises a channel quality indicator (CQI) with a first payload size when the portion of the subframe comprises the uplink regular portion, and wherein the determined content either includes a CQI with a second payload size or does not include a CQI when the portion of the subframe comprises the common uplink portion, wherein the second payload size is smaller than the first payload size.

26. The apparatus of claim 23, wherein the determined content comprises an acknowledgement (ACK), wherein a type of the ACK is based on the portion of the subframe that includes the UCI.

27. A non-transitory computer readable medium having instructions stored thereon for causing at least one processor to perform a method, the method comprising:
- determining content to include in an uplink control information (UCI) based on a portion of a subframe that includes the UCI, comprising:
  - determining whether the portion of the subframe comprises a first portion of the subframe or a second portion of the subframe different from the first portion;
  - when the portion is the first portion of the subframe, determining the content to be a first content; and
  - when the portion is the second portion of the subframe, determining the content to be a second content different from the first content; and
- transmitting the UCI in the portion of the subframe.

28. The non-transitory computer readable medium of claim 27, wherein the first portion of the subframe comprises an uplink regular portion and wherein the second portion of the subframe comprises a common uplink portion.

29. The non-transitory computer readable medium of claim 28, wherein the determined content comprises a channel quality indicator (CQI) with a first payload size when the portion of the subframe comprises the uplink regular portion, and wherein the determined content either includes a CQI with a second payload size or does not include a CQI when the portion of the subframe comprises the common uplink portion, wherein the second payload size is smaller than the first payload size.

30. The non-transitory computer readable medium of claim 27, wherein the determined content comprises an acknowledgement (ACK), wherein a type of the ACK is based on the portion of the subframe that includes the UCI.

* * * * *